United States Patent
Notoh et al.

(10) Patent No.: US 11,545,320 B2
(45) Date of Patent: Jan. 3, 2023

(54) SWITCH UNIT

(71) Applicants: TOYOTA JIDOSHA KABUSHIKI KAISHA, Toyota (JP); SUBARU CORPORATION, Tokyo (JP)

(72) Inventors: Yusuke Notoh, Toyota (JP); Naoya Kidokoro, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/568,809

(22) Filed: Jan. 5, 2022

(65) Prior Publication Data
US 2022/0310335 A1    Sep. 29, 2022

(30) Foreign Application Priority Data
Mar. 23, 2021    (JP) .............................. JP2021-049067

(51) Int. Cl.
| H01H 19/11 | (2006.01) |
| H01H 25/04 | (2006.01) |
| B60R 16/02 | (2006.01) |

(52) U.S. Cl.
CPC ............. *H01H 19/11* (2013.01); *B60R 16/02* (2013.01); *H01H 25/041* (2013.01); *B60K 2370/131* (2019.05)

(58) Field of Classification Search
CPC .. H01H 19/11; H01H 25/041; H01H 2300/01; H01H 19/14; H01H 3/50; H01H 23/143; H01H 23/30; H01H 23/025; H01H 2300/03; H01H 23/145; H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00;
(Continued)

(56) References Cited

U.S. PATENT DOCUMENTS

| 2001/0004044 | A1* | 6/2001 | Sotome | .................. | H01H 21/22 |
| | | | | | 200/5 R |
| 2006/0102453 | A1* | 5/2006 | Miyauchi | ............... | H01H 23/30 |
| | | | | | 200/5 R |

(Continued)

FOREIGN PATENT DOCUMENTS

| JP | 2002-059785 A | 2/2002 |
| JP | 2006-142906 A | 6/2006 |
| JP | 2015-096347 A | 5/2015 |

*Primary Examiner* — Ahmed M Saeed
(74) *Attorney, Agent, or Firm* — Dinsmore & Shohl LLP

(57) ABSTRACT

A switch unit includes a switch body and a switch base. The switch body is subjected to a pull-up operation from a normal position to an operated position. The switch base supports the switch body such that the switch body is pivotable about an axis parallel to a first direction extending. The switch body includes an aesthetic wall disposed to extend along an opening, and an operation wall extending toward an inner side relative to the aesthetic surface from one side at an outer edge of the aesthetic wall, the one side extending in the first direction. The operation wall is located inward of an arc centered on the axis, the arc passing through the one side extending in the first direction. A shielding wall intersecting the first direction is provided at at least one of both side edges of the operation wall in the first direction.

8 Claims, 3 Drawing Sheets

(58) Field of Classification Search
CPC ...... H01H 23/148; H01H 23/24; H01H 23/26; B60R 16/02; B60K 2370/131
See application file for complete search history.

(56) References Cited

U.S. PATENT DOCUMENTS

| | | | |
|---|---|---|---|
| 2014/0233196 A1* | 8/2014 | Mori | B60R 16/02 361/752 |
| 2015/0353142 A1 | 12/2015 | Iriguchi et al. | |
| 2020/0402750 A1* | 12/2020 | Watanabe | H01H 9/04 |

* cited by examiner

SWITCH UNIT

CROSS-REFERENCE TO RELATED APPLICATION

This application claims priority to Japanese Patent Application No. 2021-049067 filed on Mar. 23, 2021, incorporated herein by reference in its entirety.

BACKGROUND

1. Technical Field

The technology disclosed herein relates to a switch unit.

2. Description of Related Art

Japanese Unexamined Patent Application Publication No. 2006-142906 (JP 2006-142906 A) discloses a switch unit disposed in an opening in an aesthetic surface to be viewed by a user.

SUMMARY

In the switch unit, a switch body that is operable by the user is disposed to extend along the opening, and thus, an aesthetic wall of the switch body constitutes a part of the aesthetic surface in harmony with the surroundings thereof. A switch unit with a switch body to be subjected to a pull-up operation performed by a user is known as one of switch units of this kind. That is, the user operates to pull up one side at the outer edge of the aesthetic wall of the switch body from the opening in the aesthetic surface. As a result, the switch body is caused to pivot about an axis that extends along the aesthetic surface such that the switch body is pulled out from the opening in the aesthetic surface. At this time, the one side at the outer edge of the aesthetic wall moves along an arcuate track (i.e., an arcuate trajectory) about the pivot axis, and a side surface of the switch body that extends toward an inner side relative to the aesthetic surface from the one side is exposed to the outside of the aesthetic surface. When the side wall of the switch unit is curved along the arc, the gap between the side wall of the switch body and the peripheral edge defining the opening is kept constant when the user performs an operation to pull up the switch body. In consideration of the operability for the user etc., however, the side wall of the switch body may be located inward of the arc to serve as an operation wall in which the finger of the user is placed. In this case, a large gap is formed between the operation wall and the peripheral edge defining the opening when the user performs a pull-up operation. As a result, the inside of the opening may be seen between the operation wall that has been pulled up and the peripheral edge defining the opening.

In related art, in order to prevent the above-described situation, a separate wall may be provided between the operation wall and the peripheral wall defining the opening in the switch unit. In this case, however, the outer edge of the separate wall is further exposed from a space between the outer edge of the aesthetic wall and the peripheral edge defining the opening in the switch unit, which complicates the appearance of surrounding portions around the switch unit.

The disclosure provides a switch unit that is pivotable about an axis that extends along an aesthetic surface, the switch unit making it possible to prevent or restrain the inside of an opening from being seen when a pull-up operation is performed, without complicating the appearance of surrounding portions around the switch unit even in a case where an operation wall is located inward of an arc of a pivot track.

A switch unit according to an aspect of the disclosure is disposed in an opening in an aesthetic surface to be viewed by a user. The switch unit includes a switch body and a switch base. The switch body is to be subjected to a pull-up operation performed by the user from a normal position to an operated position. The switch base supports the switch body such that the switch body is pivotable between the normal position and the operated position about an axis that is parallel to a first direction that extends along the aesthetic surface. The switch body includes an aesthetic wall disposed to extend along the opening to constitute a part of the aesthetic surface, and an operation wall that extends toward an inner side relative to the aesthetic surface from one side at an outer edge of the aesthetic wall, the one side extending in the first direction. The operation wall is located inward of an arc centered on the axis, the arc passing through the one side extending in the first direction. A shielding wall that intersects the first direction is provided at at least one of both side edges of the operation wall in the first direction.

In the switch unit discussed above, when the switch body is displaced to the operated position, the shielding wall that is provided at at least one of the both side edges of the operation wall blocks the line of sight of the user, the line of sight extending to the inside of the opening. Consequently, the inside of the opening is prevented or restrained from being seen when the switch body is displaced to the operated position, even in a case where the operation wall is located inward of an arc of the pivot track. The appearance of surrounding portions around the switch unit is not complicated since the switch body is provided with the shielding wall.

The details of the technology disclosed herein and further improvements thereof will be described below in the "DETAILED DESCRIPTION OF EMBODIMENTS".

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
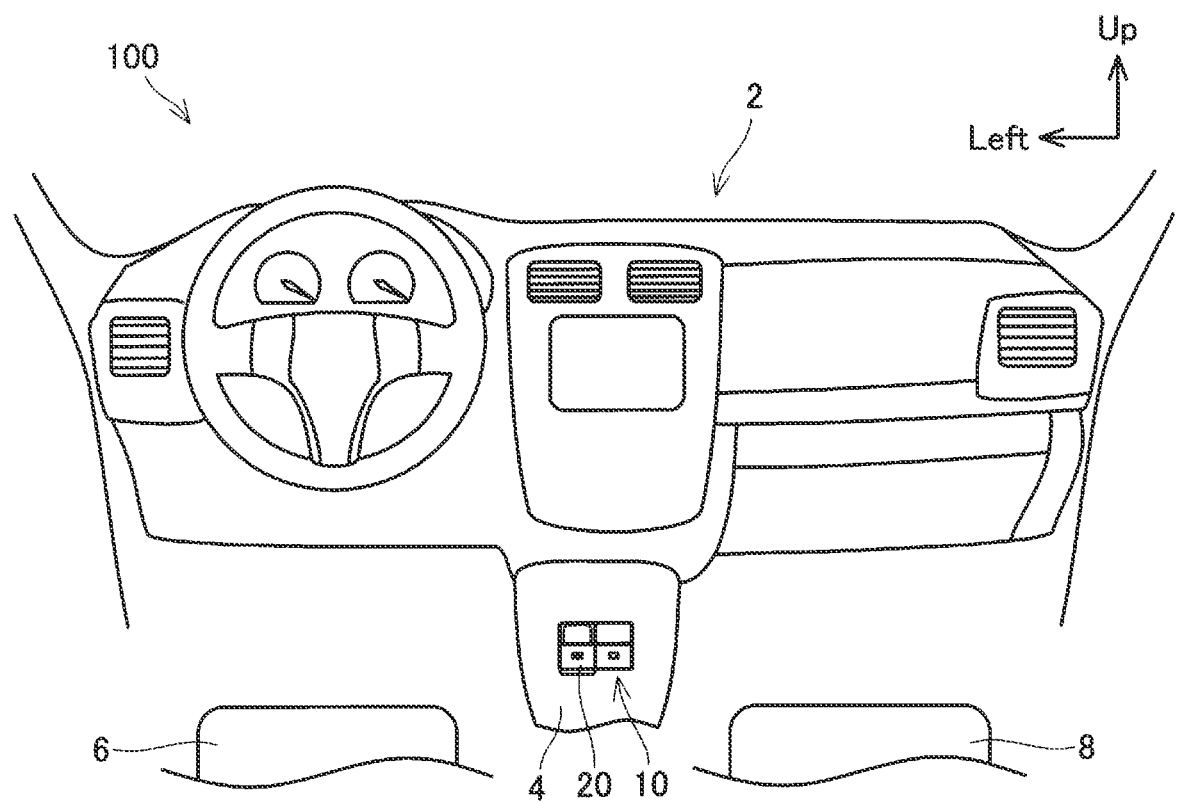
FIG. 1 illustrates a state in which an electromechanical parking brake (EPB) switch 20 is disposed in a vehicle.

In one embodiment of the present technology, the shielding wall may be provided at each of both side edges of the operation wall. With this configuration, it is possible to prevent or restrain the inside of the opening from being seen on both sides of the switch unit in the first direction.

In one embodiment of the present technology, the shielding wall may perpendicularly intersect the first direction. With this configuration, the pivot area of the shielding wall (i.e., the area in which the shielding wall pivots) in the first direction is small. As a result, it is possible to prevent or restrain the inside of the opening from being seen, with high space efficiency.

In one embodiment of the present technology, a distal end of the shielding wall may be positioned to extend along the arc centered on the axis when seen along the first direction. With this configuration, the distal end of the shielding wall is formed to extend along the pivot track, and therefore the distal end of the shielding wall does not interfere with surrounding components when the switch body is displaced to the operated position. Therefore, the distal end of the shielding wall can be brought closer to the surrounding components. As a result, the shielding wall covers a wide area as compared to a configuration in which the distal end of the shielding wall is positioned to extend along a straight line, for example. Consequently, it is possible to prevent or restrain the inside of the opening from being seen over a wide area as compared to the configuration in which the distal end is positioned to extend along a straight line.

In one embodiment of the present technology, the switch unit may further include a second switch body that is disposed in the opening, the second switch body being adjacent to the switch body in the first direction. The second switch body may be configured to be operable to a position at which the shielding wall is exposed. With this configuration, it is possible to prevent or restrain the inside of the opening from being seen, using the shielding wall, even in a case where the second switch body is operated.

In one embodiment of the present technology, the switch body may be disposed at a position at which the switch body is operable by the user positioned on a driver's seat of a vehicle. In another embodiment, however, the switch body may be disposed at a position at which the switch body is operable by the user positioned on a passenger's seat.

In one embodiment of the present technology, the switch unit may include a switch for an electromechanical parking brake for applying a braking force to wheels of the vehicle. In another embodiment, however, the switch unit may include a window switch for raising and lowering window glass of a door of the vehicle.

In one embodiment of the present technology, a distance between the one side extending in the first direction and the axis may be longer than a distance between another side extending in the first direction and the axis. With this configuration, the amount of displacement of the one side extending in the first direction with respect to the pivot angle of the aesthetic wall is large. As a result, the distance between the operation wall at the operated position and the peripheral edge defining the opening tends to be long. Therefore, the inside of the opening tends to be seen through a space between the operation wall and the peripheral edge defining the opening when the switch unit is displaced to the operated position. Therefore, the technology disclosed herein is further advantageous.

Embodiment

A switch unit according to an embodiment will be described with reference to the drawings. FIG. 1 illustrates the shape of the interior of an electric vehicle 100 on which an electromechanical parking brake (abbreviated as "EPB") switch 20 is mounted. The EPB switch 20 is an example of the switch unit according to the embodiment. In the following, the upper side of the electric vehicle 100 (i.e. the side indicated by the arrow Up in the drawings) may be referred to simply as "upper", and the opposite side thereof, which is the lower side of the electric vehicle 100, may be referred to simply as "lower". In the vehicle width direction of the electric vehicle 100, the left side (i.e. the side indicated by the arrow Left in the drawings) as seen from an occupant positioned in the cabin of the electric vehicle 100 may be referred to simply as "Left", and the opposite side thereof may be referred to simply as "Right". Likewise, the front side of the electric vehicle 100 (i.e. the side indicated by the arrow Fr in the drawings) may be referred to simply as "Front", and the opposite side thereof, which is the rear side of the electric vehicle 100, may be referred to simply as "Rear".

As illustrated in FIG. 1, the electric vehicle 100 includes an instrument panel trim 2, a console 4, a driver's seat 6, and a passenger's seat 8. The instrument panel trim 2 is an interior component positioned at the front part of the electric vehicle 100, and includes a steering wheel, meters, etc. In the instrument panel trim 2 according to the present embodiment, the steering wheel is disposed at the left part of the instrument panel trim 2. That is, the electric vehicle 100 is a so-called left-hand drive vehicle.

The console 4 is an interior component that extends toward the rear of the vehicle from the lower part of the center of the instrument panel trim 2 in the vehicle width direction. A switch module 10 is disposed at the center of the console 4. The switch module 10 includes a plurality of switches. The switch module 10 includes the EPB switch 20. A shift lever is also disposed on the console 4, although not illustrated.

The driver's seat 6 is a seat to be seated by an occupant that drives the electric vehicle 100. The passenger's seat 8 is a seat to be seated by a passenger of the electric vehicle 100. The EPB switch 20 is disposed in the switch module 10 on the driver's seat 6 side (i.e. the left side). Therefore, the occupant seated on the driver's seat 6 can easily operate the EPB switch 20.

The switch module 10 will be described in detail with reference to FIG. 2. The switch module 10 includes the EPB switch 20, a brake hold (BH) switch 18, a one pedal (OP) switch 16, and a guide 12. The switch module 10 includes a plurality of switches related to the brake of the electric vehicle 100. The switch module 10 is configured such that the switches 20, 18, and 16 and the guide 12 are exposed from an opening 42 in an aesthetic surface 40 of the console 4. This allows the user (i.e. the occupant positioned on the driver's seat 6) to operate the switches 20, 18, and 16.

The EPB switch 20 is a switch for the parking brake for restraining unintentional travel of the electric vehicle 100 by applying a braking force to wheels (not illustrated) of the electric vehicle 100. The EPB switch 20 includes a switch body 21 disposed to extend along the opening 42 and an axis R1 that extends in the vehicle width direction (i.e. in the right-left direction on the sheet surface of FIG. 2). The switch body 21 is a cover that is made of a resin and that is operable by a user. The upper surface (i.e. a surface on the closer side to a viewer of FIG. 2) of the switch body 21 is exposed from the opening 42 as an aesthetic wall 21d. As a result, the aesthetic wall 21d constitutes a part of the aesthetic surface in harmony with the aesthetic surface 40 around the opening 42. As illustrated in FIG. 2, the aesthetic wall 21d has a rectangular shape. An operation outer edge 22 is provided on the front side (i.e. on the upper side of the sheet surface of FIG. 2) of the aesthetic wall 21d. A non-operation outer edge 23 is provided on the opposite side. The operation outer edge 22 is one side that extends along the direction of the axis R1, among the outer edges of the aesthetic wall 21d. The operation outer edge 22 is the outer edge operable by the user. The non-operation outer edge 23 is another side that extends along the direction of the axis R1, among the outer edges of the aesthetic wall 21d. The non-operation outer edge 23 is the outer edge that is not operable by the user.

The switch body 21 further includes a pair of shielding walls 24R, 24L. The shielding walls 24R, 24L extend from opposite ends of the operation outer edge 22 toward the guide 12. That is, the shielding walls 24R, 24L extend in the direction intersecting the direction of the axis R1. The shielding walls 24R, 24L are positioned below the guide 12. Therefore, the shielding walls 24R, 24L are indicated by the broken line in FIG. 2.

Figure 2:
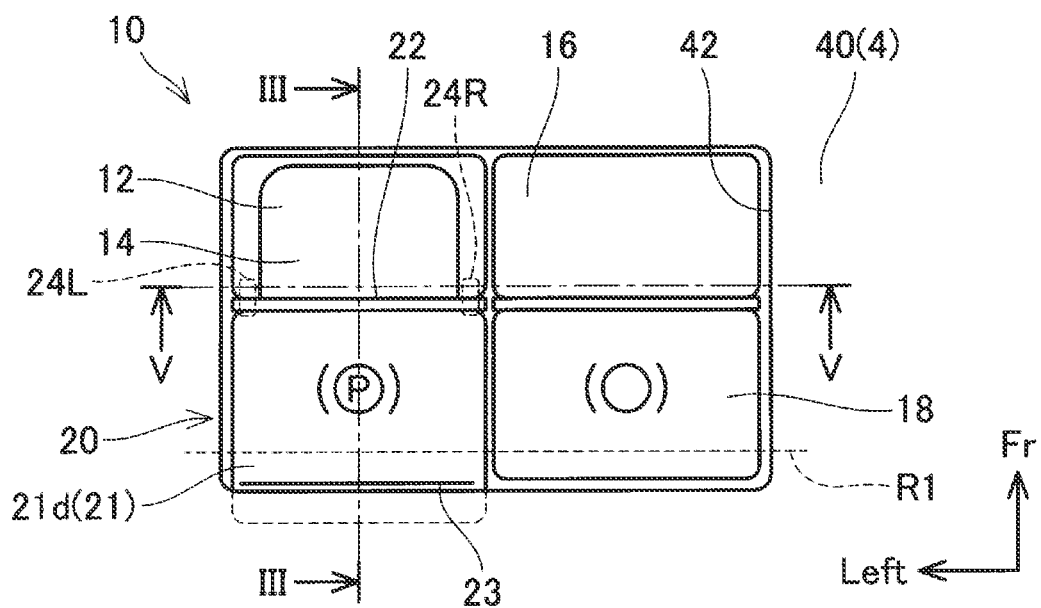
FIG. 2 illustrates an enlarged view around the EPB switch 20.

The shielding walls 24R, 24L are symmetrical to each other with respect to the center of the switch body 21 in the right-left direction (i.e. with respect to the line III-III in FIG. 2). As a result, the switch body 21 is symmetrical (i.e., has a symmetrical shape) in the right-left direction. Consequently, the EPB switch 20 can be disposed on the right side of the BH switch 18 without changing the shape of the switch body 21 in a right-hand drive electric vehicle 100. That is, the same switch body 21 can be used in common irrespective of the position of the steering wheel of the electric vehicle 100.

When the operation outer edge 22 of the aesthetic wall 21d is pushed downward (i.e. toward the further side from a viewer of FIG. 2) by the user, the switch body 21 is caused to pivot downward about the axis R1. Consequently, a signal for turning on the parking brake is transmitted to an electronic control unit (ECU) (not illustrated) of the electric vehicle 100. Upon receiving the signal for turning on the parking brake, the ECU turns on an actuator that applies a braking force to a motor of the electric vehicle 100. As a result, a braking force is applied to the wheels of the electric vehicle 100. In a modification, the ECU may apply a braking force to the wheels of the electric vehicle 100 using disc brakes, for example.

The guide 12 is disposed in front of the EPB switch 20 (i.e. on the upper side of the sheet surface of FIG. 2). The guide 12 is provided with a recessed portion 14. The recessed portion 14 is a dent that is dented downward (i.e. toward the further side from a viewer of FIG. 2), and serves as a space in which the finger of the user is placed. The finger of the user is placed in the recessed portion 14, and the user pulls the operation outer edge 22 of the aesthetic wall 21d upward (i.e. toward the closer side to a viewer of FIG. 2). Consequently, the switch body 21 is caused to pivot upward about the axis R1. As a result, the parking brake of the electric vehicle 100 is turned off.

The BH switch 18 is a switch for performing the function of automatically turning on the parking brake when the electric vehicle 100 stops traveling. The OP switch 16 is a switch for performing the function of increasing the braking force when an accelerator pedal of the electric vehicle 100 is not depressed. Both the BH switch 18 and the OP switch 16 transmit signals for turning on the functions thereof to the ECU of the electric vehicle 100 when the switches are pushed downward by the user.

Figure 3:
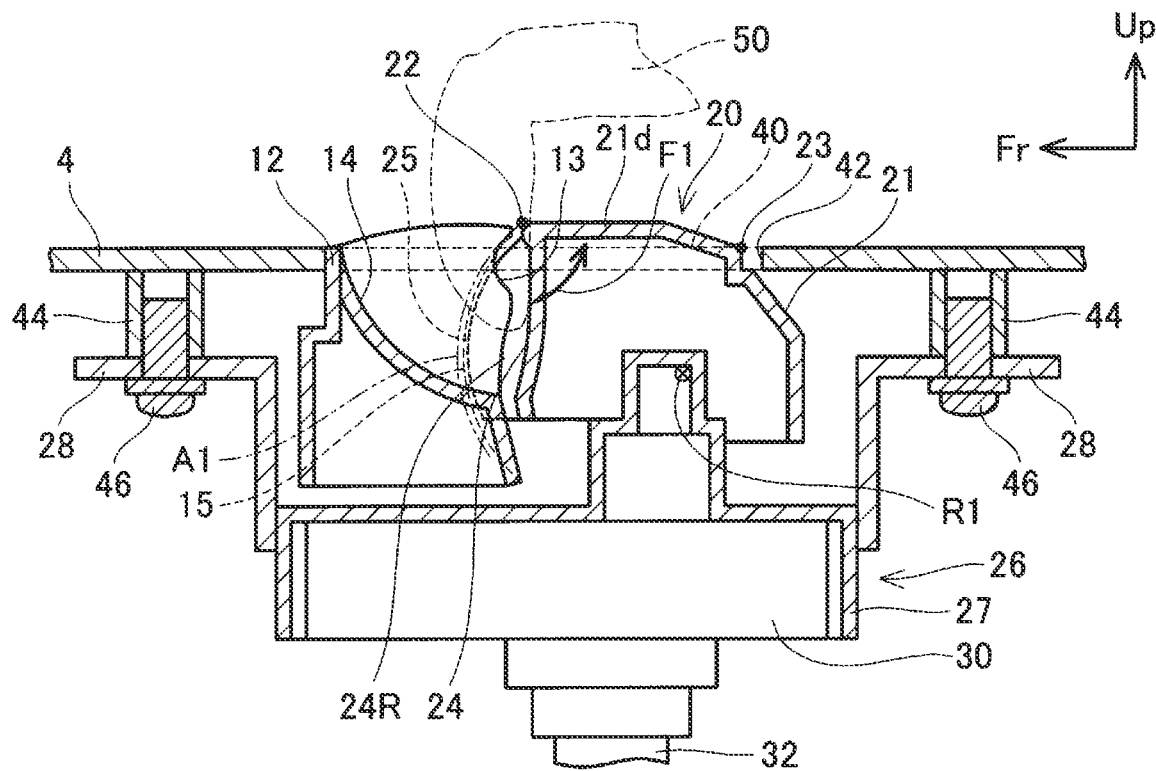
FIG. 3 is a sectional view taken along the line III-III in FIG. 2, illustrating a case where a switch body 21 of the EPB switch 20 is at a normal position.
Figure 4:
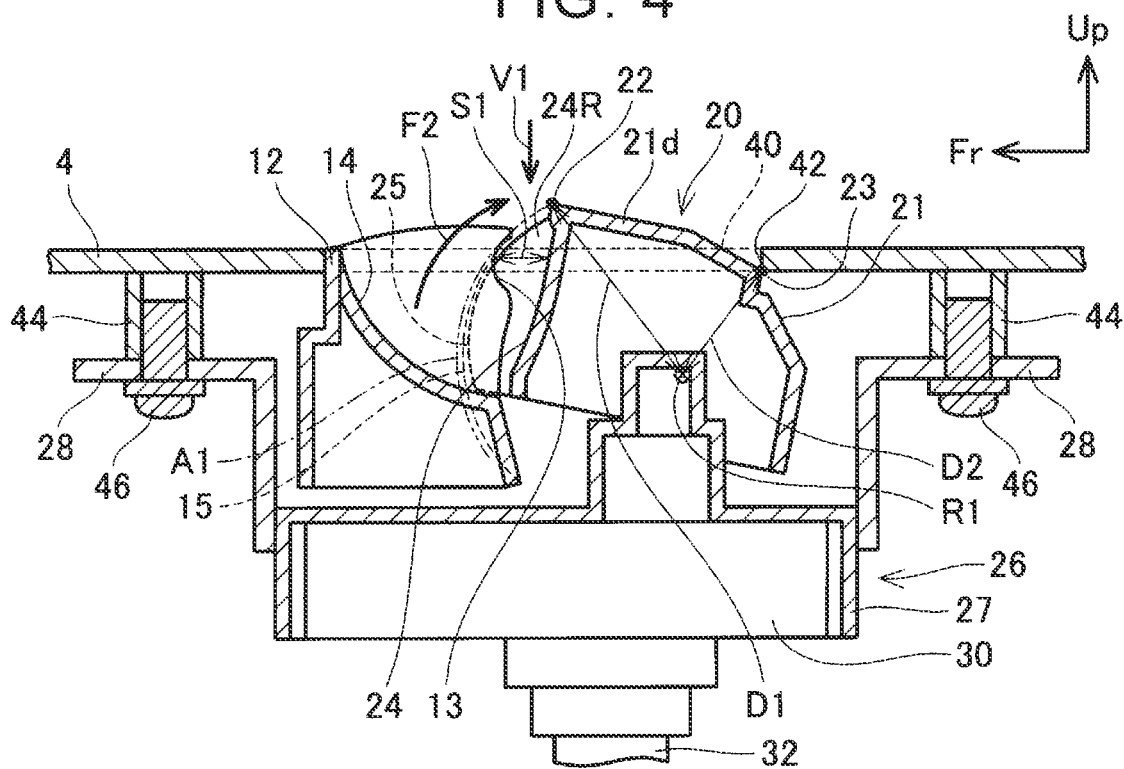
FIG. 4 is a sectional view taken along the line III-III in FIG. 2, illustrating a case where the switch body 21 is displaced to an operated position.

The detailed structure of the EPB switch 20 will be described with reference to FIGS. 3 to 6. Each of FIGS. 3 and 4 is a sectional view taken along the line III-III in FIG. 2, illustrating the sectional shape of the EPB switch 20 that is cut along a plane that is orthogonal to the axis R1. That is, each of FIGS. 3 and 4 illustrates the sectional shape of the EPB switch 20 as seen along the direction of the axis R1. FIG. 3 illustrates the sectional shape of the EPB switch 20 at a position (i.e. a normal position) at which the EPB switch 20 is not operated by the user. FIG. 4 illustrates the sectional shape of the EPB switch 20 at a position (i.e. an operated position) at which the EPB switch 20 has been subjected to a pull-up operation performed by the user.

The EPB switch 20 further includes a switch base 26 in addition to the switch body 21. The switch base 26 includes a switch holder 27 and a switch device 30. The switch holder 27 is a component that fixes the switch body 21 and the switch device 30 to the console 4. The switch holder 27 includes seat surfaces 28 respectively located on the front and rear sides (i.e. on the right and left sides of the sheet surface of FIG. 3). The seat surfaces 28 are each provided with a through-hole. The switch holder 27 is fixed to the console 4 with screws 46 that pass through the through-holes in the seat surfaces 28 and are screwed into bosses 44 provided on the back surface of the console 4. As a result, the aesthetic wall 21d of the switch body 21 of the EPB switch 20 is exposed from the opening 42 in the aesthetic surface 40 of the console 4 as illustrated in FIG. 2.

A wire harness 32 is connected to the switch device 30 from below the switch device 30. The switch device 30 transmits a signal, which is generated when the switch body 21 is operated, to the ECU of the electric vehicle 100 via the wire harness 32. The switch device 30 according to the present embodiment also transmits signals, which are generated when the BH switch 18 and the OP switch 16 are operated, to the ECU of the electric vehicle 100 via the wire harness 32.

The switch body 21 further includes an operation wall 24 in addition to the aesthetic wall 21d and the shielding walls 24R, 24L (see FIG. 2). The operation wall 24 is a side wall of the switch body 21 which is contacted by a finger 50 of the user. The operation wall 24 extends from the operation outer edge 22 toward an inner side relative to the aesthetic surface 40 (i.e. toward the lower side of the sheet surface of FIG. 3). As a result, the operation wall 24 is located inward of an arc A1. The operation wall 24 faces the recessed portion 14 of the guide 12. The finger 50 passes through the recessed portion 14 to contact the operation wall 24.

As discussed earlier, the switch body 21 is caused to pivot about the axis R1. The operation outer edge 22 of the switch body 21 moves along a pivot track (a pivot trajectory) on the arc A1 about the axis R1. To turn on the parking brake, the operation outer edge 22 of the switch body 21 is caused to pivot downward along the arc A1. Therefore, a dent 13 is provided in a side surface (i.e. a surface on the further side from a viewer of FIG. 3) of the recessed portion 14 of the guide 12. The dent 13 is a space for receiving the switch body 21 when the operation outer edge 22 of the switch body 21 is caused to pivot downward.

To turn off the parking brake, the operation outer edge 22 of the switch body 21 is pulled upward. The user places the finger 50 such that the finger 50 contacts the operation wall 24 that is located inward of the arc A1. When the finger 50 of the user in contact with the operation wall 24 is moved in the direction of the arrow F1, the operation wall 24 of the switch body 21 is pulled upward. Thus, since the switch body 21 includes the operation wall 24, the operability for the user is improved.

When the user pulls up the operation wall 24 of the switch body 21, the switch body 21 is caused to pivot in the direction of the arrow F2 about the axis R1 as illustrated in FIG. 4. In this event, the operation outer edge 22 is moved upward along the arc A1. Consequently, the operation outer edge 22 of the operation wall 24 is moved away from the guide 12, and is exposed to the outside of the aesthetic surface 40 from the opening 42. As a result, a gap between the operation wall 24 and the rear surface of the guide 12 becomes large on the inner side with respect to the arc A1 (in other words, a gap between the operation wall 24 and the rear surface of the guide 12 becomes large in an area inward of the arc A1). In particular, a relatively large clearance S1 is formed between the operation wall 24 and the dent 13 of the guide 12.

Further, a distance D1 between the operation outer edge 22 (i.e., one side extending in the direction of the axis R1) and the axis R1 is longer than a distance D2 between a non-operation outer edge 23 (i.e., another side extending in the direction of the axis R1) and the axis R1. Therefore, the pivot distance of the operation outer edge 22 with respect to the pivot angle of the switch body 21 is large. Therefore, with the EPB switch 20 according to the present embodiment, the gap between the operation wall 24 and the rear surface of the guide 12 tends to be large.

A right shielding wall 24R is caused to pivot at an edge of the operation wall 24 on the right side (i.e. on the further side from a viewer of FIG. 4). The right shielding wall 24R extends forward (i.e. toward the left side of the sheet surface of FIG. 4) toward the guide 12 from the right edge of the operation wall 24. The right shielding wall 24R extends forward of the operation wall 24, and a distal end 25 of the right shielding wall 24R is closer to the arc A1 than the operation wall 24 is. As illustrated in FIGS. 3 and 4, the distal end 25 of the right shielding wall 24R is positioned on an arc centered on the axis R1. The distance between the distal end 25 of the right shielding wall 24R and a curved surface 15 of the guide 12 is kept constant at a predetermined distance. The predetermined distance is a minimum distance including the manufacturing error and variations in pivot motion.

When the switch body 21 is pulled up in the direction of the arrow F2, the right shielding wall 24R covers the gap between the operation wall 24 and the rear surface of the guide 12. That is, the right shielding wall 24R prevents or restrains the inside of the opening 42 from being exposed to a line of sight V1 of the user. The internal unit of the OP switch 16, which is positioned inside the opening 42, is not seen even when the switch body 21 is pulled up by the finger 50. Further, the right shielding wall 24R is positioned between the dent 13 of the guide 12 and the OP switch 16. Therefore, the right shielding wall 24R can prevent or restrain the internal unit of the OP switch 16 from being seen via the clearance S1. In this manner, the right shielding wall 24R can prevent or restrain the inside of the opening 42 from being seen.

Further, as illustrated in FIG. 3, the right shielding wall 24R of the switch body 21 is disposed on the lower side of the opening 42 in the aesthetic surface 40 when the switch body 21 is at the normal position. Therefore, the upper surface of the right shielding wall 24R is not seen from the user when the switch body 21 is at the normal position. As a result, the outer edge of the right shielding wall 24R is not exposed to a space between the EPB switch 20 and the BH switch 18 as illustrated in FIG. 2. Therefore, the appearance of surrounding portions around the EPB switch 20 is not complicated.

As discussed earlier, the distal end 25 of the right shielding wall 24R is positioned on the arc centered about the axis R1, and thus is as close as possible to the curved surface 15. Consequently, the right shielding wall 24R can cover a wider area in the inside of the opening 42.

Figure 5:
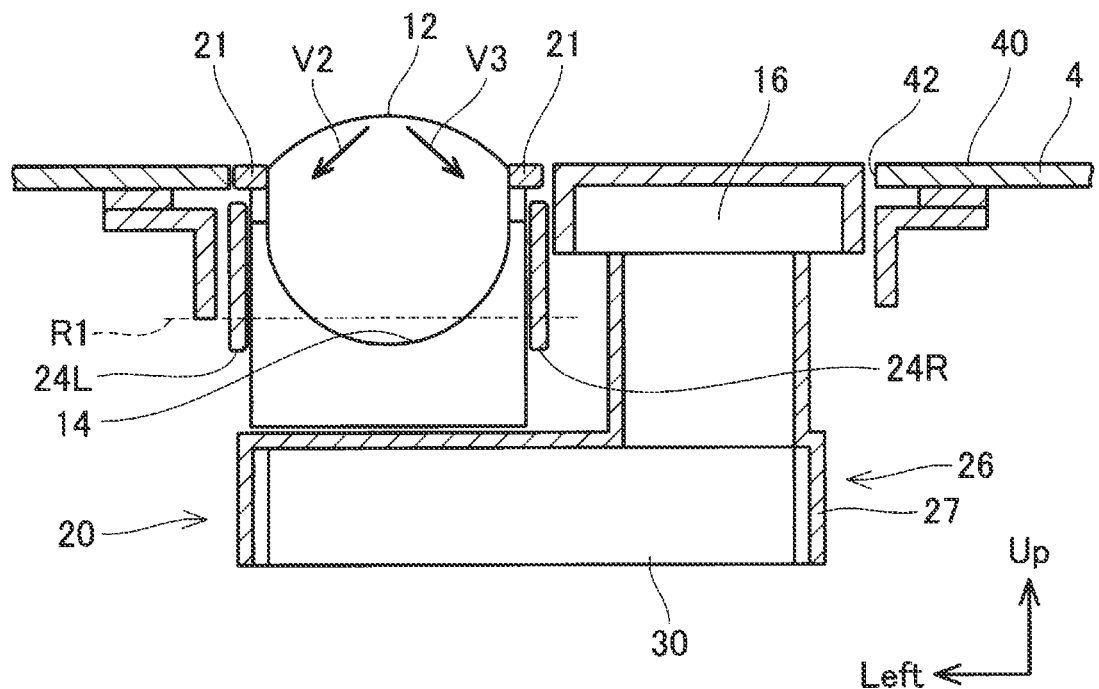
FIG. 5 is a sectional view taken along the line V-V in FIG. 2, illustrating a case where the switch body 21 is displaced to the operated position.

FIG. 5 is a sectional view taken along the line V-V in FIG. 2, illustrating a state in which the switch body 21 has been pulled up (i.e. in the operated position). As illustrated in FIG. 5, the switch body 21 includes the pair of shielding walls 24R, 24L. The shielding walls 24R, 24L are respectively disposed at both side edges of the operation wall 24 in the direction of the axis R1. As discussed earlier, the switch body 21 is symmetrical in the right-left direction. Therefore, the structure of the left shielding wall 24L is similar to that of the right shielding wall 24R discussed above. Consequently, it is possible to prevent or restrain the inside of the opening 42 from being seen on each of both sides of the EPB switch 20 in the direction of the axis R1. More specifically, the left shielding wall 24L covers the inside of the console 4 from a line of sight V2, and the right shielding wall 24R covers the internal unit of the OP switch 16 in the direction of a line of sight V3 as described with reference to FIGS. 3 and 4.

As illustrated in FIG. 5, each of the shielding walls 24R, 24L perpendicularly intersects the axis R1. Consequently, the pivot track of each of the shielding walls 24R, 24L can be made small in the direction of the axis R1. Therefore, the space in which the shielding walls 24R, 24L are housed can be made small in the direction of the axis R1, and therefore the size of the EPB switch 20 can be made small in the direction of the axis R1.

Figure 6:
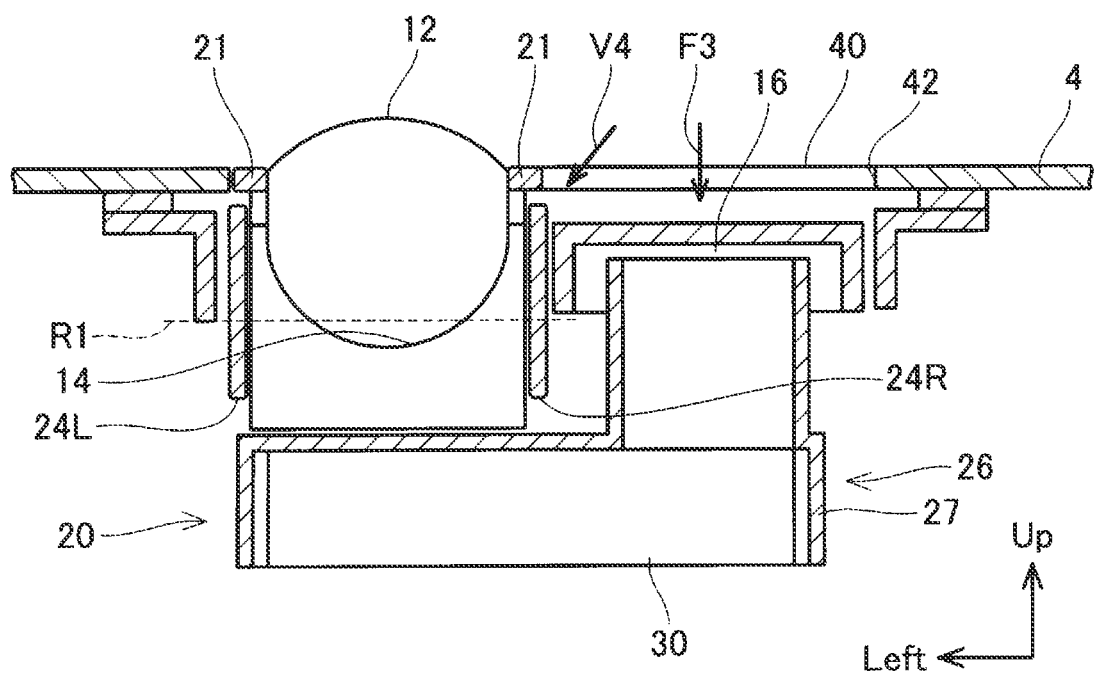
FIG. 6 is a sectional view taken along the line V-V in FIG. 2, illustrating a case where the switch body 21 is at the normal position.

FIG. 6 is a sectional view taken along the line V-V in FIG. 2, illustrating a state in which the switch body 21 is not pulled up (i.e. in the state in FIG. 3). The OP switch 16 is pushed downward by the user as indicated by the arrow F3 in FIG. 6. When the OP switch 16 is pushed downward, the right shielding wall 24R is exposed as illustrated in FIG. 6. As a result, the right shielding wall 24R covers the right side surfaces of the switch body 21 and the guide 12 from a line of sight V4. In this manner, the right shielding wall 24R can prevent or restrain the internal unit of the EPB switch 20 from being exposed when the OP switch 16 is moved downward.

In the embodiment discussed above, the direction of the axis R1 is an example of the "first direction". The OP switch 16 and the BH switch 18 are each an example of the "second switch body".

While the embodiment has been described in detail above, the embodiment is merely exemplary, and does not limit the scope of the disclosure. The disclosure includes various modifications and alterations of the specific example described above. Modifications of the embodiment discussed above will be listed below.

First Modification

While the switch body 21 according to the embodiment discussed above includes the pair of shielding walls 24R, 24L, a shielding wall may be provided at at least one of the both side edges of the operation wall 24 in a modification. For example, a shielding wall may be provided at only a side edge on the side facing the user.

Second Modification

The shielding walls 24R, 24L may not perpendicularly intersect the axis R1. For example, the angle of the shielding walls 24R, 24L relative to the axis R1 may be changed in accordance with the positional relationship between the user and the EPB switch 20.

Third Modification

The distal ends of the shielding walls 24R, 24L may not be positioned to extend along an arc centered on the axis R1.

Fourth Modification

The distance D1 between the operation outer edge 22 and the axis R1 may be equal to the distance D2 between the non-operation outer edge 23 and the axis R1, or the distance D2 may be longer than the distance D1.

Fifth Modification

In the embodiment discussed above, the BH switch 18 and the OP switch 16 are disposed adjacent to the EPB switch 20. In a modification, only the EPB switch 20 may be disposed in the opening 42. That is, the second switch body may be omitted.

Sixth Modification

The technology disclosed herein is not limited to the EPB switch 20. In a modification, a window switch disposed on a door on the passenger's seat side of the electric vehicle 100 may include a shielding wall.

While specific examples of the disclosure have been described in detail above, the specific examples are merely exemplary, and do not limited the scope of the disclosure. The disclosure includes various modifications and alterations of the specific examples described above. The technical elements described in the present specification or the drawings exhibit technical usefulness alone or in various combinations, and are not limited to the combinations described in the specific examples. The technology described herein or illustrated in the drawings may achieve a plurality of objects at the same time, and has technical utility by achieving one of the objects by itself.

What is claimed is:

1. A switch unit disposed in an opening in an aesthetic surface to be viewed by a user, the switch unit comprising:
    a switch body to be subjected to a pull-up operation performed by the user from a normal position to an operated position; and
    a switch base that supports the switch body such that the switch body is pivotable between the normal position and the operated position about an axis that is parallel to a first direction that extends along the aesthetic surface, wherein:
    the switch body includes an aesthetic wall disposed to extend along the opening to constitute a part of the aesthetic surface, and an operation wall that extends toward an inner side relative to the aesthetic surface from one side at an outer edge of the aesthetic wall, the one side extending in the first direction;
    the operation wall is located inward of an arc centered on the axis, the arc passing through the one side extending in the first direction; and
    a shielding wall that intersects the first direction is provided at at least one of both side edges of the operation wall in the first direction.

2. The switch unit according to claim 1, wherein the shielding wall is provided at each of the both side edges of the operation wall.

3. The switch unit according to claim 1, wherein the shielding wall perpendicularly intersects the first direction.

4. The switch unit according to claim 1, wherein a distal end of the shielding wall is positioned to extend along the arc centered on the axis when seen along the first direction.

5. The switch unit according to claim 1, further comprising a second switch body that is disposed in the opening, the second switch body being adjacent to the switch body in the first direction, wherein the second switch body is configured to be operable to a position at which the shielding wall is exposed.

6. The switch unit according to claim 1, wherein the switch body is disposed at a position at which the switch body is operable by the user positioned on a driver's seat of a vehicle.

7. The switch unit according to claim 6, wherein the switch unit includes a switch for an electromechanical parking brake for applying a braking force to wheels of the vehicle.

8. The switch unit according to claim 1, wherein a distance between the one side extending in the first direction and the axis is longer than a distance between another side extending in the first direction and the axis.

* * * * *